United States Patent
Hirano et al.

(10) Patent No.: US 9,562,480 B2
(45) Date of Patent: Feb. 7, 2017

(54) AUTOMATIC ENGINE-STOP CONTROL DEVICE FOR VEHICLE

(71) Applicant: Nissan Motor Co., Ltd., Kanagawa (JP)

(72) Inventors: Masahiro Hirano, Kanagawa (JP); Kouichi Mori, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 451 days.

(21) Appl. No.: 14/359,392

(22) PCT Filed: Oct. 16, 2012

(86) PCT No.: PCT/JP2012/076699
§ 371 (c)(1),
(2) Date: May 20, 2014

(87) PCT Pub. No.: WO2013/077114
PCT Pub. Date: May 30, 2013

(65) Prior Publication Data
US 2014/0309912 A1    Oct. 16, 2014

(30) Foreign Application Priority Data

Nov. 24, 2011 (JP) ................................. 2011-255755

(51) Int. Cl.
*F02N 11/08*    (2006.01)
*F02D 17/02*    (2006.01)
(Continued)

(52) U.S. Cl.
CPC ............... *F02D 17/02* (2013.01); *F02D 17/00* (2013.01); *F02D 29/02* (2013.01);
(Continued)

(58) Field of Classification Search
CPC .............. F02N 11/0814; F02N 11/0818; F02N 11/0822; F02N 11/0825; F02N 11/0833
(Continued)

(56) References Cited

U.S. PATENT DOCUMENTS 6,334,499 B1 * 1/2002 Matsubara ............. B60K 6/485
180/65.26
8,831,830 B2 * 9/2014 Ito ........................... F02D 29/02
701/22
(Continued)

FOREIGN PATENT DOCUMENTS

| EP | 1077149 A2 | 2/2001 |
|---|---|---|
| JP | 2002-021597 A | 1/2002 |

(Continued)

OTHER PUBLICATIONS

International Search Report issued in PCT/JP2012/076699 mailed on Nov. 13, 2012 (4 pages).
(Continued)

*Primary Examiner* — Thomas Moulis
(74) *Attorney, Agent, or Firm* — Osha Liang LLP

(57) ABSTRACT

An automatic engine-stop control device for a vehicle has a coast stop controlling section that stops an engine during a running of the vehicle when a predetermined condition is satisfied, a deceleration detecting section that detects a deceleration level of the vehicle, and an engine-stop time limiting section that limits a time length for which the coast stop controlling section keeps the engine in a stopped state if the deceleration level is smaller than or equal to a predetermined value.

5 Claims, 4 Drawing Sheets

(51) Int. Cl.
*F02D 17/00* (2006.01)
*F02D 29/02* (2006.01)

(52) U.S. Cl.
CPC ........ *F02N 11/0833* (2013.01); *F02N 11/084* (2013.01); *F02N 2200/0801* (2013.01); *Y02T 10/48* (2013.01)

(58) Field of Classification Search
USPC .......................................... 123/179.3, 179.4
See application file for complete search history.

(56) References Cited

U.S. PATENT DOCUMENTS

| | | | | |
|---|---|---|---|---|
| 9,043,119 | B2* | 5/2015 | Horii | F02D 29/02 701/102 |
| 9,080,534 | B2* | 7/2015 | Matsunaga | F02N 11/0822 |
| 9,157,382 | B2* | 10/2015 | Matsunaga | B60W 10/06 |
| 9,188,070 | B2* | 11/2015 | Asakura | F02D 29/02 |
| 9,422,908 | B2* | 8/2016 | Matsunaga | F02D 41/00 |
| 2009/0017985 | A1* | 1/2009 | Choi | B60K 6/485 477/68 |
| 2011/0046864 | A1* | 2/2011 | Kamiya | F02N 11/0833 701/102 |
| 2012/0080001 | A1* | 4/2012 | Saito | F02N 11/0822 123/179.4 |
| 2012/0136553 | A1* | 5/2012 | Takeuchi | F02N 11/0814 701/102 |

FOREIGN PATENT DOCUMENTS

| | | |
|---|---|---|
| JP | 2005-147048 A | 6/2005 |
| JP | 2006-161565 A | 6/2006 |
| JP | 2006-170295 A | 6/2006 |
| WO | 2011/021305 A1 | 2/2011 |

OTHER PUBLICATIONS

Written Opinion of the International Searching Authority issued in PCT/JP2012/076699 mailed on Nov. 13, 2012 (3 pages).

* cited by examiner

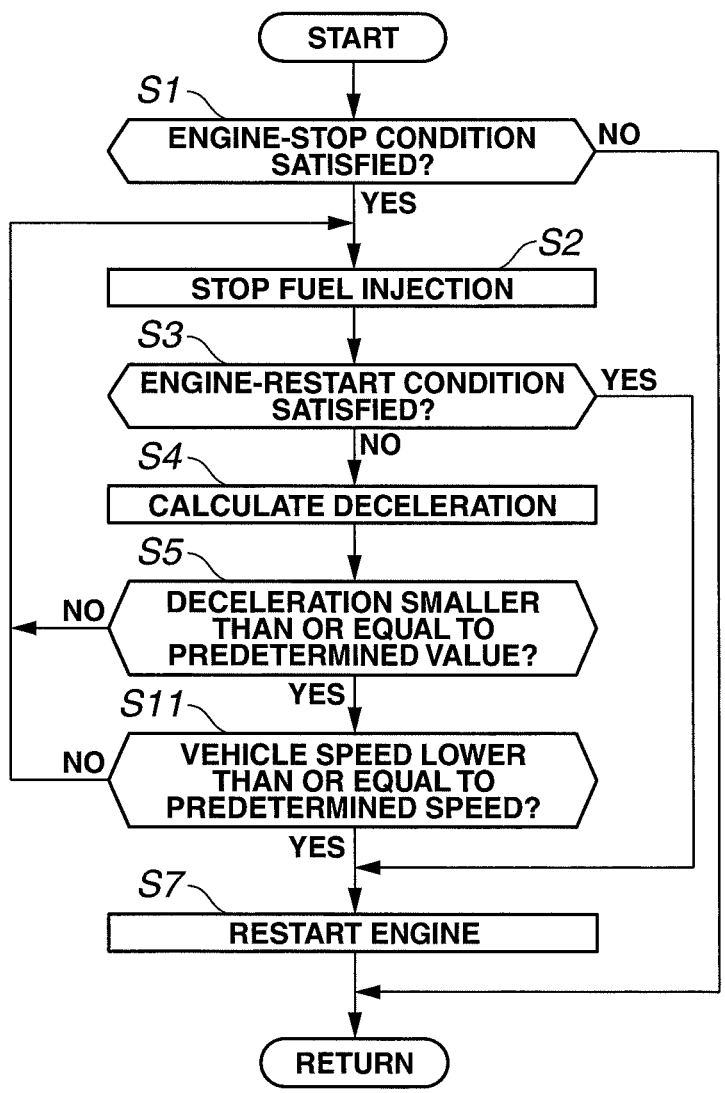

AUTOMATIC ENGINE-STOP CONTROL DEVICE FOR VEHICLE

TECHNICAL FIELD

The present invention relates to an automatic engine-stop control device which automatically stops an engine during a running of vehicle.

BACKGROUND ART

Patent Literature 1 discloses a device that automatically stops an engine when a vehicle speed is reduced down to a reference speed. In this technique, the reference speed is set to increase with an increase of deceleration level of the vehicle.

However, in this technique, a state where a steering load is large continues for a long time if the vehicle runs under a slowly-decelerating state. At this time, if a driver manipulates a steering wheel, there is a problem that a voltage reduction of battery is incurred due to electric-power consumption of a power steering apparatus.

It is an object of the present invention to provide an automatic engine-stop control device for a vehicle, devised to suppress the voltage reduction of battery when a driver manipulates the steering wheel during the slowly-decelerating run.

CITATION LIST

Patent Literature

Patent Literature 1: Japanese Patent Application Publication No. 2006-161565

SUMMARY OF THE INVENTION

According to the present invention, a time for which an engine is kept in a stopped state is limited if a deceleration level of the vehicle is smaller than or equal to a predetermined value.

Accordingly, the voltage reduction of battery can be suppressed when a driver manipulates the steering wheel during the slowly-decelerating run, because the engine is restarted before the steering load is further enlarged.

BRIEF EXPLANATION OF DRAWINGS

FIG. 4 A flowchart showing a control processing for automatic stop and restart of the engine, which is executed by the engine control unit 10 in a second embodiment according to the present invention.

DETAILED DESCRIPTION OF INVENTION

Figure 1:
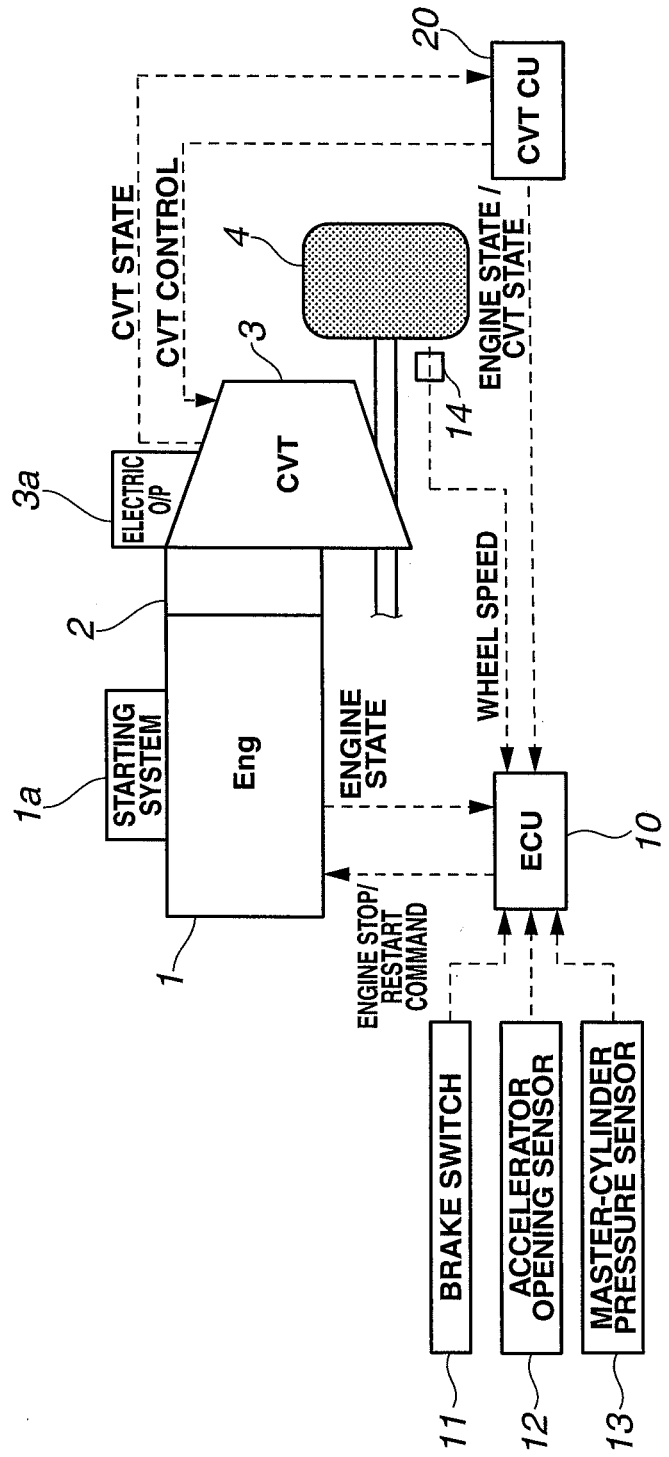
FIG. 1 A system diagram showing an automatic engine-stop control device in a first embodiment according to the present invention.

Hereinafter, embodiments of an automatic engine-stop control device for a vehicle according to the present invention will be explained referring to the drawings.

[First Embodiment]

At first, a configuration in a first embodiment according to the present invention will now be explained. FIG. 1 is a system diagram showing an automatic engine-stop control device in the first embodiment. A rotative driving force derived from an engine 1 is inputted through a torque converter 2 into a belt-type continuously-variable transmission 3. Then, this rotative driving force is transmitted to drive wheels (drive road-wheels) 4 after the belt-type continuously-variable transmission 3 attains speed change by a desired speed ratio (pulley ratio). The engine 1 includes a starting system 1a which starts the engine 1. Specifically, the starting system 1a includes a starter motor. The starting system 1a performs an engine cranking together with fuel injection on the basis of an engine-start command, and stops the starter motor when the engine 1 comes to be able to rotate self-sustainedly.

The torque converter 2 is provided on an output side of the engine 1. The torque converter 2 performs a torque amplification in a low vehicle-speed region. Moreover, the torque converter 2 includes a lockup clutch which prohibits a relative rotation in a region higher than or equal to a predetermined vehicle speed (e.g., 14 km/h). An output side of the torque converter 2 is connected with the belt-type continuously-variable transmission 3. The belt-type continuously-variable transmission 3 includes a starting clutch, a primary pulley, a secondary pulley, and a belt wound between (wound around) both the primary and secondary pulleys. The belt-type continuously-variable transmission 3 attains a desired speed ratio by varying pulley-groove widths by way of hydraulic control. Moreover, an oil pump which is driven by the engine 1 is provided inside the belt-type continuously-variable transmission 3. The oil pump of the belt-type continuously-variable transmission 3 supplies a converter pressure and a lockup-clutch pressure for the torque converter 2 as a hydraulic-pressure source, when the engine 1 is in operation. Moreover, the oil pump supplies a pulley pressure(s) and a clutch-engaging pressure for the belt-type continuously-variable transmission 3.

Moreover, the belt-type continuously-variable transmission 3 is equipped with an electric oil pump 3a. This electric oil pump 3a operates to supply necessary hydraulic pressures to respective actuators when the oil pump provided inside the belt-type continuously-variable transmission 3 is unable to supply hydraulic pressure due to an automatic stop of the engine 1. Accordingly, even when the engine 1 is in a stopped state, a desired speed ratio can be attained while maintaining the clutch engaging pressure.

An operating state of the engine 1 is controlled by an engine control unit 10. The engine control unit 10 receives a brake signal derived from a brake switch 11, an accelerator signal derived from an accelerator-opening sensor 12, a brake manipulation-amount signal (a master-cylinder pressure) derived from a master-cylinder pressure sensor 13, a road-wheel speed signal derived from a road-wheel speed sensor 14, a CVT condition signal derived from an after-mentioned CVT control unit 20, an engine-water temperature signal, a crank angle signal, an engine rotational-speed signal and the like. The brake switch 11 outputs an ON signal as the brake signal when a driver manipulates a brake pedal. The accelerator-opening sensor 12 detects an accelerator-pedal manipulation amount of the driver. The master-cylinder pressure sensor 13 detects the master-cylinder pressure which is caused based on a manipulation amount of the brake pedal. The road-wheel speed sensor 14 is provided to each road-wheel of the vehicle. The engine control unit 10 performs the start or automatic stop of the engine 1 on the basis of the above-mentioned various signals. It is noted that a depressing-force sensor which detects a stroke amount of the brake pedal or a depressing force of the brake pedal may be used in place of the master-cylinder pressure sensor 13. Alternatively, any sensor which detects a wheel-cylinder pressure of the road-wheel may be used in place of the master-cylinder pressure sensor 13. These sensors also can detect the manipulation amount of the brake pedal so that a braking intention of the driver is detected.

The CVT control unit 20 transmits and receives signals of the operating state of the engine 1 and an operating state of the CVT (continuously-variable transmission) 3, to or from the engine control unit 10. On the basis of these signals, the CVT control unit 20 controls the speed ratio of the belt-type continuously-variable transmission 3, and the like. Specifically, when a running mode (running shift range) is selected, the CVT control unit 20 engages the starting clutch and determines the speed ratio from a speed-ratio map based on the accelerator-pedal opening and the vehicle speed. Thereby, the CVT control unit 20 controls hydraulic pressures of the respective pulleys. Moreover, the CVT control unit 20 releases the lockup clutch when the vehicle speed is lower than the predetermined speed, whereas the CVT control unit 20 engages the lockup clutch such that the engine 1 is directly connected with the belt-type continuously-variable transmission 3 when the vehicle speed is higher than or equal to the predetermined speed. Furthermore, when the automatic engine stop is carried out during the running mode, the CVT control unit 20 activates the electric oil pump 3a so as to secure necessary hydraulic pressure.

[Control Processing for Automatic Engine Stop]

Next, a control processing of the automatic engine stop which is executed in the engine control unit 10 will now be explained. In the first embodiment, a so-called idling-stop control is performed in which an idling of the engine 1 is stopped when a predetermined condition is satisfied during the stopped state of the vehicle. Detailed explanations about the idling-stop control will be omitted because the known configurations thereof can be employed. Additionally in the first embodiment, a coast stop control is performed in which the engine 1 is stopped during a running and decelerating state of the vehicle when it is determined that there is a high possibility that the vehicle stops and comes to be under the idling-stop control.

In the case of a vehicle which performs the idling-stop control but does not perform the coast stop control, normally, the fuel injection is stopped so that the engine rotational speed is maintained through the lockup clutch by a coasting torque transmitted from the drive road-wheels 4 when the driver is moving the vehicle by inertia without manipulating the accelerator pedal, i.e. when the vehicle is in a so-called coasting state (including an operating state of the brake pedal). However, when the vehicle speed is reduced down to the predetermined speed, the lockup clutch is released. Then, the rotation of the engine 1 stops if the fuel injection is not restarted. Therefore, when the lockup clutch is released, the fuel injection is restarted to maintain the self-sustained rotation of the engine. Thereafter, it is judged whether or not various conditions such as a condition that the vehicle is in a completely stopped state and a condition that the brake pedal is in a sufficiently depressed state are satisfied. If these conditions are satisfied, the idling of the engine is stopped.

In the case of such a vehicle, the fuel injection is temporarily restarted from the running state where the fuel injection has been stopped, and then, the engine is stopped again. In this process, fuel consumption can be saved if the fuel which is used at the time of restart of the fuel injection can be further suppressed. Therefore, in the first embodiment according to the present invention, the coast stop control is performed in which the engine is maintained in the stopped state without restarting the fuel injection (no fuel injection) when a predetermined condition is met during the coasting of the vehicle. Then, the coast stop control is changed into a normal idling-stop control after the vehicle stops.

[Control Processing for Automatic Stop and Restart of Engine]

Figure 2:
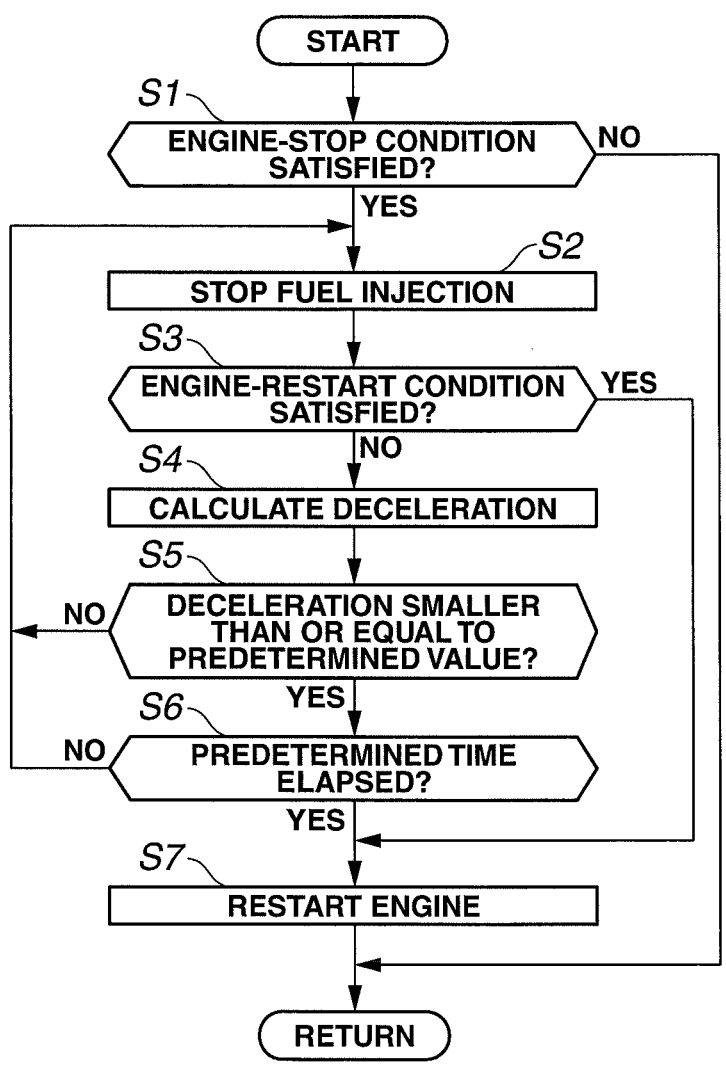
FIG. 2 A flowchart showing a control processing for automatic stop and restart of the engine, which is executed by an engine control unit 10 in the first embodiment.

FIG. 2 is a flowchart showing a control processing for automatic stop and restart of the engine, which is executed in the engine control unit 10 according to the first embodiment. Respective steps of the flowchart will now be explained.

At step S1, it is judged whether or not an engine-stop condition is satisfied. If YES at step S1, an engine-stop permission flag is set to "ON". Then, the program proceeds to step S2. If NO at step S1, the program is returned. Specifically, the engine-stop condition is satisfied when all of the following three requirements (criteria) are met.

1. Brake switch 11 is in "ON" state.
2. Manipulation amount of accelerator pedal is equal to zero.
3. Vehicle speed is lower than or equal to reference speed (=the speed at which the lockup clutch is released).

At step S2, the stop of fuel injection is continued. That is, the engine 1 is automatically stopped by the coast stop control. At this time, a timer starts to count.

It is noted that the process of step S2 corresponds to a coast stop controlling means or section according to the present invention. At step S3, it is judged whether or not an engine-restart condition is satisfied. If YES at step S3, the program proceeds to step S7. If NO at step S3, the program proceeds to step S4. The engine-restart condition is satisfied when at least any one of the three requirements of step S1 is not met.

At step S4, a deceleration (speed-reduction rate) of the vehicle is calculated from a change of the vehicle speed per unit time. The vehicle-speed change per unit time is obtained from respective signals of the road-wheel speed sensors 14 or a signal of a rotational-speed sensor (not shown) provided in the belt-type continuously-variable transmission 3. It is noted that the process of step S4 corresponds to a deceleration detecting means or section according to the present invention. At step S5, it is judged whether or not the deceleration of the vehicle is smaller than or equal to a predetermined value. If YES at step S5, the program proceeds to step S6. If NO at step S5, the count value of the timer is reset (to zero), and then the program turns back to step S2.

At step S6, it is judged whether or not a predetermined time period has elapsed under a state where the deceleration of the vehicle is smaller than or equal to the predetermined value since the engine-stop permission flag was set to "ON", on the basis of the count value of the timer. That is, it is judged whether or not the state where the deceleration of the vehicle is smaller than or equal to the predetermined value has continued for the predetermined time period since the engine-stop permission flag was set to "ON", on the basis of whether or not the count value of the timer has reached a set value. If YES at step S6, the program proceeds to step S7. If NO at step S6, the program turns back to step S2. This predetermined time period is given as a time length within which the vehicle speed is considered to be higher than or equal to a certain speed above which a steering load is smaller than or equal to an upper limit of allowable range. This allowable range for the steering load is set as a range within which a battery voltage is reduced to an extent that a necessary electric-current for the starter motor can be secured when the driver manipulates a steering wheel simultaneously with a request of engine start, for example, just after the predetermined time period.

At step S7, the engine-stop permission flag is set to "OFF", so that the engine is restarted. It is noted that the process of step S7 corresponds to an engine-stop time limiting means or section according to the present invention.

Next, operations and effects based on the above control processing will now be explained.

[Suppressing Operations for Voltage Reduction of Battery]

In a case of conventional coast stop control, the engine is stopped regardless of the deceleration (speed-reduction rate) of the vehicle when the vehicle speed decreases down to a reference speed. In this case, a time length necessary to completely stop the vehicle becomes longer as the deceleration of the vehicle becomes smaller. Moreover, the steering load becomes larger with the decrease of the vehicle speed. That is, an electrical-power consumption of a power steering apparatus which is caused when the driver manipulates the steering wheel becomes larger as the vehicle speed becomes lower. Accordingly, if the driver manipulates the steering wheel under the stopped state of the engine and during a slowly-decelerating running (travel) of the vehicle, electric power which is supplied from the battery is relatively large. Hence, a voltage drop of the battery is incurred, so that the following problems are caused.

(a) A steering burden to the driver increases because a desired assist force cannot be obtained.

(b) The other electric equipment has a trouble such as a reset because the battery voltage is more likely to be lowered when the engine start is required during the steering manipulation.

(c) A start-up performance (startability) of the engine is worsened because the starter motor cannot receive a necessary electric-current.

These three problems are incurred in both of a case of electric power steering apparatus which directly assists by a motor power and a case of motor-driven-type hydraulic power steering apparatus which produces assist force by hydraulic pressure produced from a motor power. In a case of hydraulic power steering apparatus, the above two problems (b) and (c) are not incurred, however, the above problem (a) is outstanding because the assist force becomes equal to zero.

Contrary to this, in the first embodiment according to the present invention, the engine 1 is restarted when the predetermined time period has just elapsed since the engine 1 was stopped, if the deceleration of the vehicle is smaller than or equal to the predetermined value. That is, in the case of the slowly-decelerating running (i.e., gently-speed-reducing running) of the vehicle, the engine 1 can be restarted before the vehicle speed becomes too low, i.e. before the steering load becomes too large, by limiting a stop time length (time length of the stopped state) of the engine 1. Thereby, the above-mentioned problems (a) to (c) can be solved. That is, the shortage of assist force of the power steering apparatus which is caused due to the reduction of the battery voltage can be reduced. Therefore, the steering burden to the driver can be inhibited from increasing. Moreover, the reduction of the battery voltage which is caused when the request of engine start occurs during the manipulation of the steering wheel can be suppressed, so that the trouble such as the reset of the other electric equipment can be reduced. Moreover, necessary electric-current for the starter motor can be secured more reliably, so that the worsening of the start-up performance of the engine can be suppressed.

In the first embodiment according to the present invention, the engine 1 is restarted when the state where the deceleration of the vehicle is smaller than or equal to the predetermined value has continued just for the predetermined time period since or after the engine 1 was stopped (stop of fuel injection). In a case that the automatic stop of the engine 1 is prohibited at the time of slowly-decelerating running, an original purpose (i.e., the improvement of fuel economy) of the coast stop control is impaired. Moreover, since the steering load is proportional to the reciprocal of the square of the vehicle speed, the steering load is not enlarged so much until the vehicle speed becomes sufficiently low. That is, until the vehicle speed becomes sufficiently low, a consumption electric-current of the power steering apparatus is small, so that the reduction of battery voltage is not problematic. Therefore, the first embodiment according to the present invention can satisfy both of the improvement of fuel economy and the suppression of battery-voltage reduction, by keeping the engine 1 in the stopped state for the predetermined time period.

Figure 3:
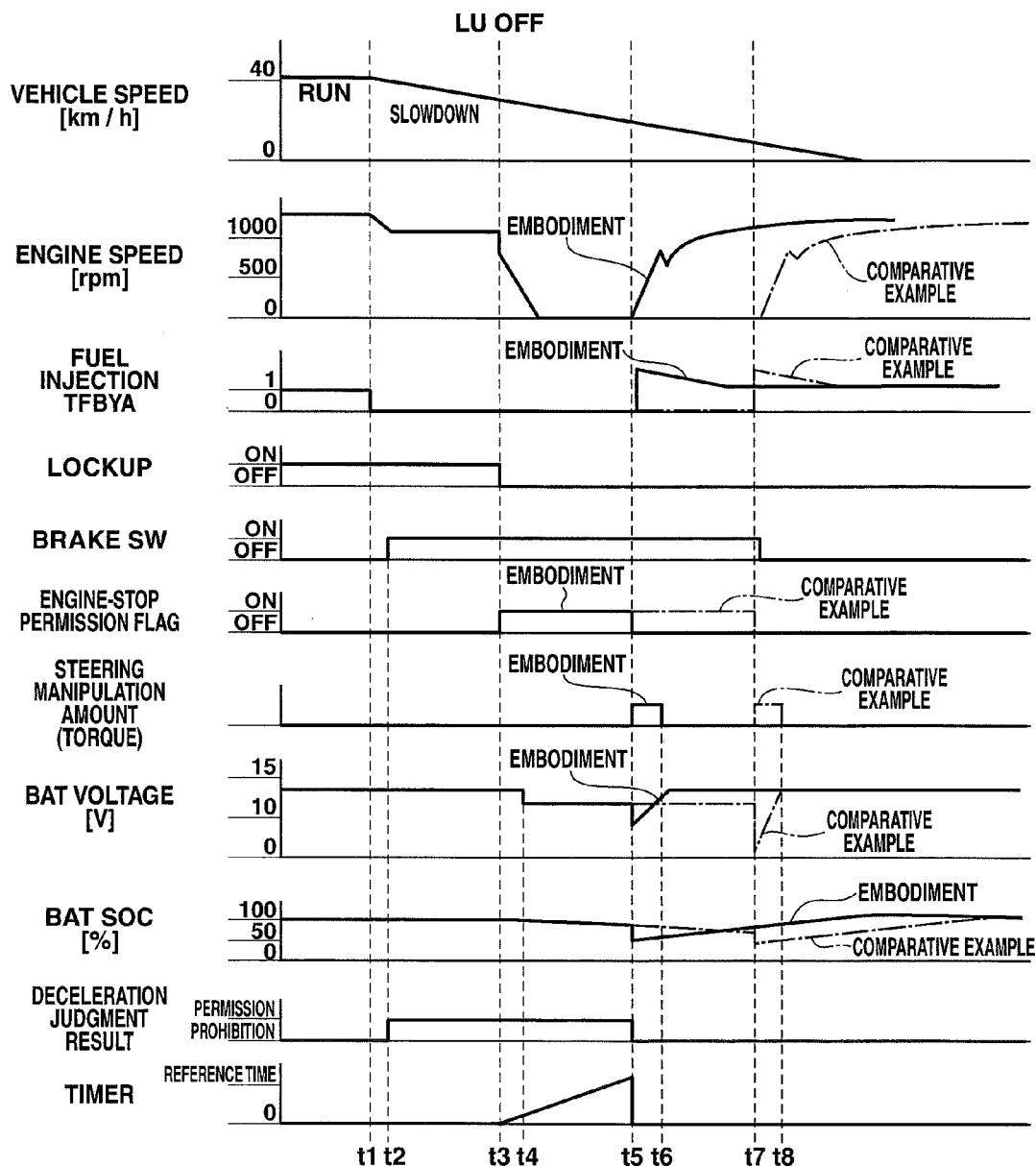
FIG. 3 A timing chart showing operations of the automatic stop-and-restart control of the engine in the first embodiment.

FIG. 3 is a timing chart showing the operations of the automatic stop and restart control of the engine in the first embodiment. Moreover, the timing chart of FIG. 3 shows a comparative example by broken lines. This comparative example represents the case that the automatic stop and restart processing of the engine as the first embodiment is not performed, i.e. represents the case of simple coast stop control.

At first, the comparative example will now be explained. At time point t1, the vehicle starts to decelerate because the driver releases his foot from the accelerator pedal. At this time, the vehicle becomes in the coasting state (coast running state). Hence, the fuel injection of the engine is stopped. At time point t2, the driver depresses the brake pedal. Then, the vehicle continues to decelerate at a deceleration level smaller than or equal to the above-mentioned predetermined value.

At time point t3, the vehicle speed becomes lower than or equal to the reference speed to satisfy the engine-stop condition. Hence, the engine-stop permission flag turns to "ON", so that the coast stop control for maintaining the stop of fuel injection is started. At time point t4, the voltage of the battery decreases from a power-generation voltage of an alternator down to a specific voltage (normal voltage) of the battery, in response to the engine stop. At time point t7, the driver releases his foot from the brake pedal, so that the engine-stop permission flag turns to "OFF". Hence, the engine is reactivated by restarting the engine cranking and the fuel injection. Also, the driver manipulates the steering wheel from time point t7 to time point t8. Thereby, the voltage of the battery is largely lowered such that the above-mentioned reset of the other electric equipment and/or the worsening of the start-up performance are caused.

Contrary to this, in the first embodiment according to the present invention, the timer starts to count (S1→S2→S3 in FIG. 2) when the engine-stop permission flag turns to "ON" at time point t3, if the deceleration level of the vehicle is smaller than or equal to the predetermined value. At time point t5, the predetermined time period has just elapsed under the state where the deceleration level of the vehicle is smaller than or equal to the predetermined value since the engine-stop permission flag turned to "ON". Hence, the engine is restarted (S5→S6→S7 in FIG. 2). Also, the driver manipulates the steering wheel from time point t5 to time point t6. Thereby, the voltage of the battery is reduced. However, this voltage reduction of the battery is suppressed because the vehicle speed is still high and hence the steering load is small as compared with that of the comparative example.

According to the automatic engine-stop control device in the first embodiment, the following listed advantageous effects are obtainable.

(1) The first embodiment includes the step S2 (the coast stop controlling means) configured to stop an engine 1 during a running of vehicle when a predetermined condition is satisfied; the step S4 (the deceleration detecting means) configured to detect a deceleration level of the vehicle; and the step S7 (the engine-stop time limiting means) configured to limit a time length for which the step S2 (the coast stop controlling means) keeps the engine 1 in a stopped state if the deceleration level is smaller than or equal to a predetermined value. Accordingly, a drop of the battery voltage can be suppressed when a driver manipulates the steering wheel during the slowly-decelerating running.

(2) The step S7 (the engine-stop time limiting means) is configured to restart the engine 1 when a state where the deceleration level of the vehicle is smaller than or equal to the predetermined value has continued for a predetermined time period after the step S2 (the coast stop controlling means) stopped the engine 1. Accordingly, both of the improvement of fuel economy and the suppression of battery-voltage drop can be attained.

(3) The step S4 (the deceleration detecting means) is configured to calculate the deceleration level of the vehicle on the basis of a change of vehicle speed per unit time. Accordingly, the deceleration level (speed-reduction rate) can be accurately calculated without providing an acceleration sensor.

[Second Embodiment]

In a second embodiment according to the present invention, the engine 1 is restarted (reactivated) when the vehicle speed becomes equal to a (second) predetermined speed as substitute for the judgment based on the elapsed time. Configurations different from the first embodiment will now be explained. Since the other configurations are the same as those of the first embodiment, explanations thereof will be omitted for the purpose of simplification of the disclosure.

[Control Processing for Restart of Automatic Engine Stop]

FIG. 4 is a flowchart showing a control processing for automatic stop and restart of the engine, which is executed in the engine control unit 10 according to the second embodiment. The flowchart of FIG. 4 is obtained by giving step S11 to the flowchart of FIG. 2 in place of step S6. In the case of the flowchart of FIG. 4, the timer for counting is unnecessary. At step S11, it is judged whether or not the vehicle speed is lower than or equal to the (second) predetermined speed. If YES at step S11, the program proceeds to step S7. If NO at step S11, the program turns back to step S2. The (second) predetermined speed is set as a speed value above which the steering load is smaller than or equal to the upper limit of the allowable range.

Next, operations and effects based on the above control processing will now be explained. In the second embodiment, the engine 1 is restarted when the vehicle speed becomes lower than or equal to the (second) predetermined speed. As mentioned above, in the case that the automatic stop of the engine 1 is prohibited at the time of slowly-decelerating running, the original purpose (i.e., the improvement of fuel economy) of the coast stop control is impaired. Moreover, since the steering load is proportional to the reciprocal of the square of the vehicle speed, the steering load is not enlarged so much until the vehicle speed becomes sufficiently low. That is, until the vehicle speed becomes sufficiently low, the consumption electric-current of the power steering apparatus is small, so that the reduction of battery voltage is not problematic. Therefore, the second embodiment according to the present invention can satisfy both of the improvement of fuel economy and the suppression of battery-voltage reduction, by causing the engine 1 to remain in the stopped state until the vehicle speed becomes lower than or equal to the (second) predetermined speed.

According to the automatic engine-stop control device in the second embodiment, the following advantageous effects are obtainable in addition to the above advantageous effects (1) to (3) in the first embodiment.

(4) The step S7 (the engine-stop time limiting means) is configured to restart the engine 1 when a vehicle speed becomes lower than or equal to a predetermined speed after the step S2 (the coast stop controlling means) stopped the engine. Accordingly, both of the improvement of fuel economy and the suppression of battery-voltage drop can be attained.

[Other Embodiments]

Although the invention has been explained above with reference to the first and second embodiments, the invention is not limited to the embodiments described above. The above-described embodiments can be varied or modified as needed. For example, although the belt-type continuously-variable transmission is employed in the above-described embodiments, the other transmissions such as a step-type automatic transmission and a manual transmission can be used according to the present invention. Moreover, although the torque converter is provided in the above-described embodiments, the present invention is applicable also to a vehicle which is not equipped with the torque converter. Moreover, according to the present invention, the time period for which the engine remains in the stopped state may be restricted to zero, i.e. the stop of the engine may be prohibited, in the case of slowly-decelerating running.

The invention claimed is:

1. An automatic engine-stop control device for a vehicle, comprising:
   a coast stop controlling section that stops an engine during a running of the vehicle when a predetermined condition is satisfied;
   a deceleration detecting section that detects a deceleration level of the vehicle; and
   an engine-stop time limiting section that limits a time length for which the coast stop controlling section keeps the engine in a stopped state if the deceleration level is smaller than or equal to a predetermined value.

2. The automatic engine-stop control device according to claim 1,
   wherein the engine-stop time limiting section restarts the engine when a state where the deceleration level is smaller than or equal to the predetermined value has continued for a predetermined time period after the coast stop controlling section stopped the engine.

3. The automatic engine-stop control device according to claim 1,
   wherein the engine-stop time limiting section restarts the engine when a vehicle speed becomes lower than or equal to a predetermined speed after the coast stop controlling section stopped the engine.

4. The automatic engine-stop control device according to claim 1, wherein the deceleration detecting section calculates the deceleration level of the vehicle on the basis of a change of vehicle speed per unit time.

5. The automatic engine-stop control device according to claim 2,
wherein the deceleration detecting section calculates the deceleration level of the vehicle on the basis of a change of vehicle speed per unit time.

\* \* \* \* \*